United States Patent
Kim et al.

(10) Patent No.: US 10,673,300 B2
(45) Date of Patent: Jun. 2, 2020

(54) MOTOR

(71) Applicant: LG INNOTEK CO., LTD., Seoul (KR)

(72) Inventors: Jin Ho Kim, Seoul (KR); Seong Jin Kim, Seoul (KR); Kyung Sang Park, Seoul (KR); Chang Hyun Park, Seoul (KR); Woo Seob Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/210,852

(22) Filed: Dec. 5, 2018

(65) Prior Publication Data

US 2019/0109510 A1    Apr. 11, 2019

Related U.S. Application Data

(62) Division of application No. 14/678,158, filed on Apr. 3, 2015, now Pat. No. 10,181,764.

(30) Foreign Application Priority Data

Apr. 4, 2014   (KR) .................. 10-2014-0040565
Dec. 30, 2014  (KR) .................. 10-2014-0193902

(51) Int. Cl.
| | |
|---|---|
| *H02K 5/173* | (2006.01) |
| *H02K 5/15* | (2006.01) |
| *H02K 7/10* | (2006.01) |
| *H02K 7/06* | (2006.01) |

(52) U.S. Cl.
CPC ............ *H02K 5/1735* (2013.01); *H02K 5/15* (2013.01); *H02K 7/10* (2013.01); *H02K 7/06* (2013.01)

(58) Field of Classification Search
CPC .......... H02K 5/1735; H02K 5/15; H02K 7/10; H02K 7/06
See application file for complete search history.

(56) References Cited

U.S. PATENT DOCUMENTS 2,388,955 A  * 11/1945  Couse ..................... H02K 7/10
                                                              310/115
2,998,539 A  *  8/1961  Bessiere ............. F16H 61/0202
                                                                310/99

(Continued)

FOREIGN PATENT DOCUMENTS

DE        2939560 A1    4/1981
DE   10-259426 A1    6/2004

(Continued)

OTHER PUBLICATIONS

Office Action dated Nov. 19, 2019 in Korean Application No. 10-2014-0040565.

(Continued)

*Primary Examiner* — Mohamad A Musleh
(74) *Attorney, Agent, or Firm* — Saliwanchik, Lloyd & Eisenschenk

(57) ABSTRACT

Disclosed is a motor including a housing having a first receiving part formed at one side thereof, a stator disposed in the housing, a rotor disposed in the housing, a rotating shaft rotated along with the rotor, a holder coupled to one side of the housing, and a bearing disposed between the first receiving part and the holder to support a rotation of the rotor.

15 Claims, 13 Drawing Sheets

(56) References Cited

U.S. PATENT DOCUMENTS

| | | | |
|---|---|---|---|
| 3,221,193 A * | 11/1965 | Kober | H02K 5/1735 |
| | | | 310/90 |
| 5,237,231 A * | 8/1993 | Blaettner | H02K 1/17 |
| | | | 310/239 |
| 5,815,345 A | 9/1998 | Pelstring et al. | |
| 2002/0135248 A1 | 9/2002 | Coyac et al. | |
| 2012/0169163 A1 | 7/2012 | Imai et al. | |

FOREIGN PATENT DOCUMENTS

| | | |
|---|---|---|
| EP | 0780955 A1 | 6/1997 |
| EP | 1103332 A1 | 5/2001 |
| EP | 1414133 A1 | 4/2004 |
| EP | 1641107 A1 | 3/2006 |
| EP | 2 160 819 B1 | 5/2008 |
| EP | 2 160 819 A2 | 3/2010 |
| JP | 09-224359 A | 8/1997 |
| JP | H11-241668 A | 9/1999 |
| JP | 2000-152557 A | 5/2000 |
| JP | 2002-195281 A | 7/2002 |
| JP | 2003-301913 A | 10/2003 |
| JP | 2004-060866 A | 2/2004 |
| JP | 2006-211806 A | 8/2006 |
| JP | 2007-274826 A | 10/2007 |
| JP | 2009-201234 A | 9/2009 |
| JP | 2010-022168 A | 1/2010 |
| JP | 2010-065778 A | 3/2010 |
| KR | 10-2001-0049247 A | 6/2001 |
| KR | 10-2012-0096730 A | 8/2012 |
| KR | 10-2013-0128086 A | 11/2013 |
| WO | WO-2010/044349 A1 | 4/2010 |

OTHER PUBLICATIONS

Supplementary Partial European Search Report dated Oct. 17, 2017 in European Application No. 15773648.9.

Office Action dated Jun. 5, 2018 in Chinese Application No. 201580018646.5, along with its English translation.

Office Action dated Oct. 24, 2018 in European Application No. 15773648.9.

Office Action dated Mar. 26, 2019 in Japanese Application No. 2016-560696.

* cited by examiner (a)

(b)

MOTOR

CROSS-REFERENCE TO RELATED APPLICATIONS

This application is a divisional of U.S. application Ser. No. 14/678,158, filed Apr. 3, 2015; which claims the benefit under 35 U.S.C. § 119 of Korean Patent Application Nos. 10-2014-0040565, filed Apr. 4, 2014; and 10-2014-0193902, filed Dec. 30, 2014; which are herein incorporated by reference in their entirety.

BACKGROUND

Field of the Invention

The present invention relates to a motor having enhanced reliability with respect to an axial load.

Discussion of Related Art

Generally, in a motor, a stator is disposed at an inner circumferential surface of a housing, and a rotor is disposed at a center of the stator. The rotor is rotated by an electromagnetic interaction with the stator so as to transmit power to an outside.

For example, a motion member coupled to a rotating shaft of the motor may press an external master cylinder, and thus may operate a brake system. However, the motor receives a large axial load, while pressing the master cylinder, and the axial load is transmitted to a bearing which supports the rotating shaft.

Therefore, the motor which receives the axial load may maintain reliability only when securely supporting the bearing. In a conventional motor, a groove in which the bearing is inserted is formed at the housing so as to support the bearing. However, such a structure may not securely support the bearing against the axial load.

BRIEF SUMMARY

The present invention is directed to a motor which is capable of stably supporting a bearing, even when an axial load is applied.

According to an aspect of the present invention, there is provided a motor including a housing having a first receiving part formed at one side thereof, a stator disposed in the housing, a rotor disposed in the housing, a rotating shaft rotated along with the rotor, a holder coupled to one side of the housing, and a bearing disposed between the first receiving part and the holder to support a rotation of the rotor.

The rotor may include a rotor core having a core part in which a motion member is accommodated and a rotating support part supported by the bearing, and a rotor magnet disposed at an outer circumferential surface of the core part.

An outer diameter of the rotating support part may be smaller than an outer diameter of the core part.

The first receiving part may include a first protruding part configured to fix one end of the bearing.

The holder may include a second receiving part in which the bearing is accommodated, a second protruding part configured to fix the other end of the bearing, and a coupling part fixed to one side of the housing.

A thickness of the first protruding part may be smaller than a thickness of the second protruding part.

The first receiving part may include a first screw thread formed at an inner circumferential surface thereof, and the holder may include a second receiving part in which the bearing is accommodated, a second protruding part configured to fix the other end of the bearing, and a coupling part coupled to the first screw thread.

According to another aspect of the present invention, there is provided a motor including a housing having a first receiving part formed at one side thereof, a stator disposed in the housing, a rotor disposed in the housing, a rotating shaft rotated along with the rotor, a motion member linearly moved by a rotation of the rotating shaft, a holder disposed between the first receiving part and the stator, and a bearing disposed between the first receiving part and the holder to support a rotation of the rotor.

The first receiving part may include a first protruding part configured to fix one end of the bearing.

The holder may include a second receiving part in which the bearing is accommodated, a second protruding part configured to fix the other end of the bearing, and a coupling part fixed to an inner side of the housing.

The holder may include a groove formed at an area facing the stator.

The first receiving part may include a third screw thread formed at an inner circumferential surface thereof, and the holder may include a second receiving part in which the bearing is accommodated, a second protruding part configured to fix the other end of the bearing, and a coupling part coupled to the third screw thread.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF MAIN ELEMENTS

Figure 1:
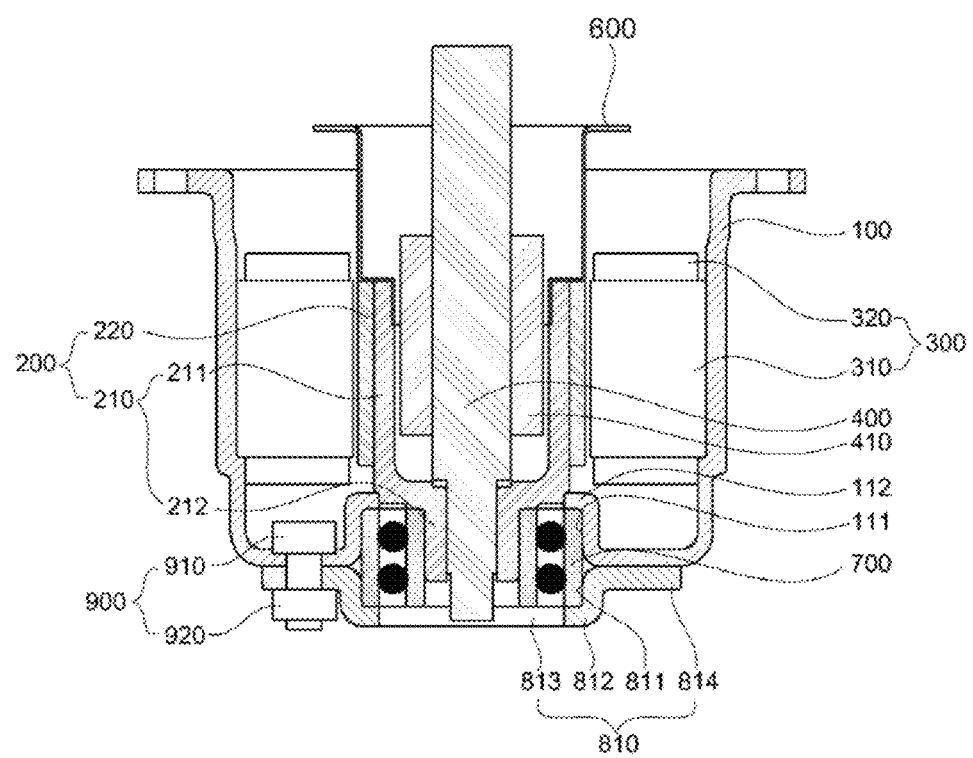
FIG. 1 is a conceptual view of a motor in accordance with a first embodiment of the present invention.

| | |
|---|---|
| 100: housing | 111, 121: first receiving part |
| 112, 122: first protruding part | 200: rotor |
| 300: stator | 400: rotating shaft |
| 410: motion member | 700: bearing |
| 810, 820, 830, 840, 850, 860, 870, 880: holder | |

DETAILED DESCRIPTION OF EXEMPLARY EMBODIMENTS

Although the present invention can be modified variously and have several embodiments, specific exemplary embodiments are illustrated in the accompanying drawings and will be described in detail in the detailed description. However, the present invention is not limited to the embodiments, and it should be understood that the present invention comprises all of equivalents and substitutes included in the technical scope and spirit of the invention.

Terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the invention. The term "and/or" encompasses combinations of a plurality of items or any one of the plurality of items.

It is to be noted that, in this specification, when a certain component is said to be connected to another component, the certain component may be directly connected to the other component, or a third component may be interposed therebetween. On the other hand, when a certain component is said to be directly connected to another component, no third component is interposed therebetween.

The terms used herein are merely to describe a specific embodiment, and do not limit the present invention. Further, unless the context clearly indicates otherwise, singular expressions should be interpreted to include plural expressions. It is understood that terms "comprises," "comprising," "includes" or "has" are intended to indicate the presence of features, numerals, steps, operations, elements and components described in the specification or the presence of combinations of these, and do not preclude the presence or additional possibilities of one or more other features, numerals, steps, operations, elements and components, or the presence of combinations of these.

Hereinafter, exemplary embodiments of the present invention will be described in detail with reference to the accompanying drawings, wherein like reference numerals refer to like or corresponding elements throughout the drawings and repeated description thereof will be omitted.

Figure 2:
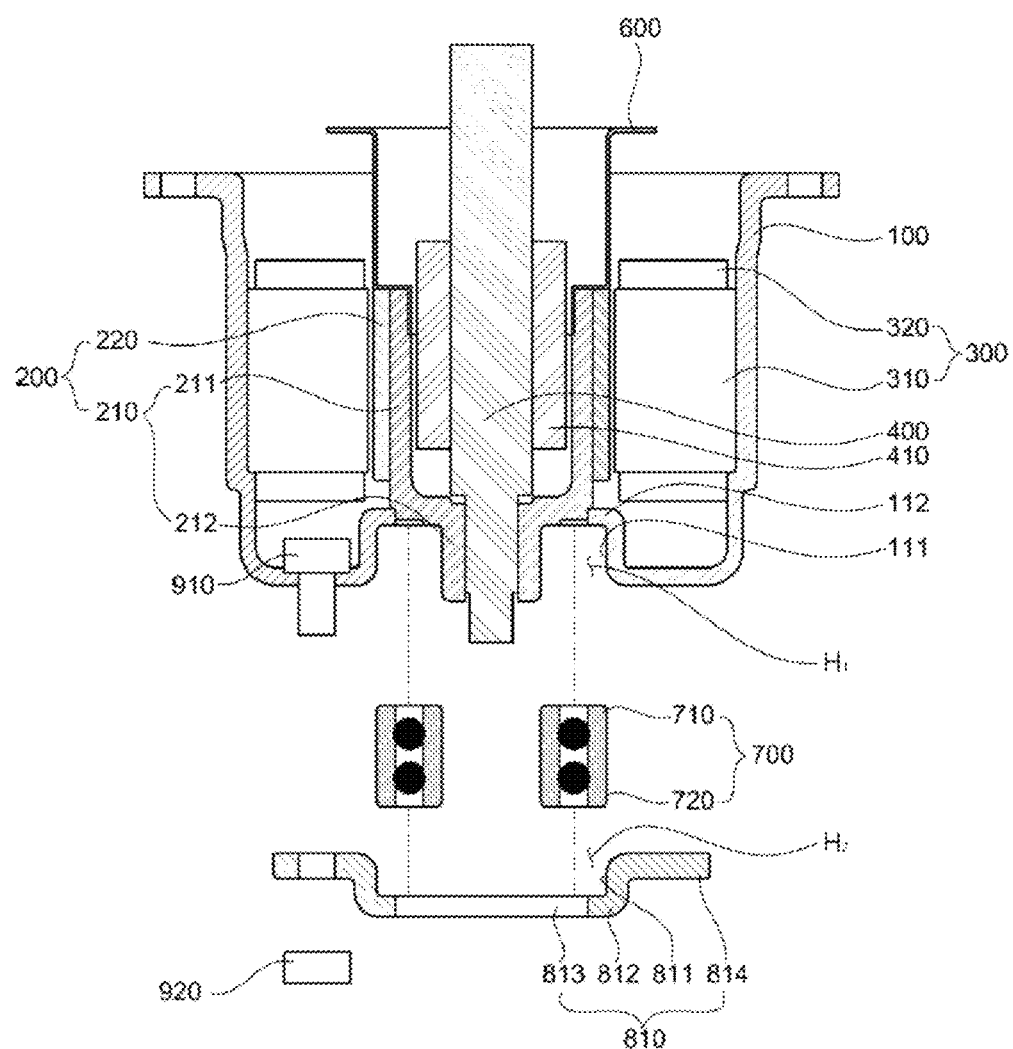
FIG. 2 is an exploded perspective view of FIG. 1.
Figure 3:
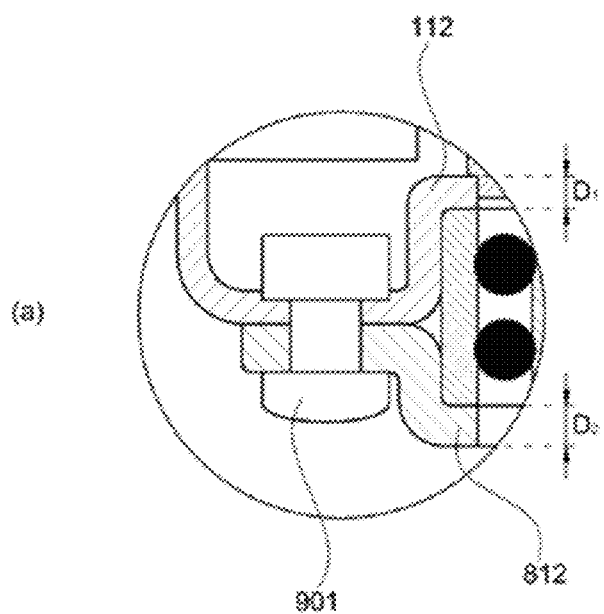
FIG. 3 is a view illustrating various coupling means between a housing and a holder in accordance with the first embodiment of the present invention.
Figure 3:
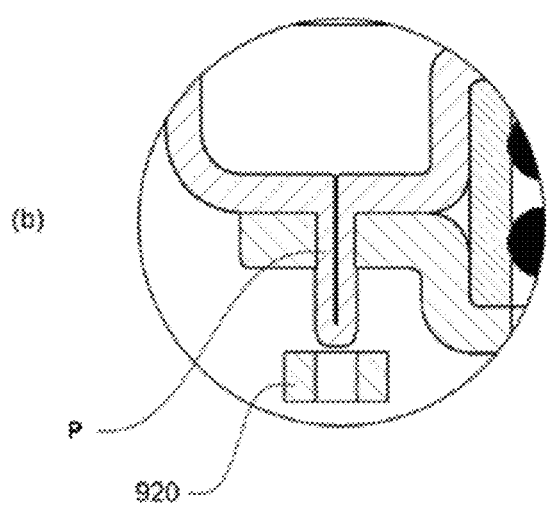
Figure 4:
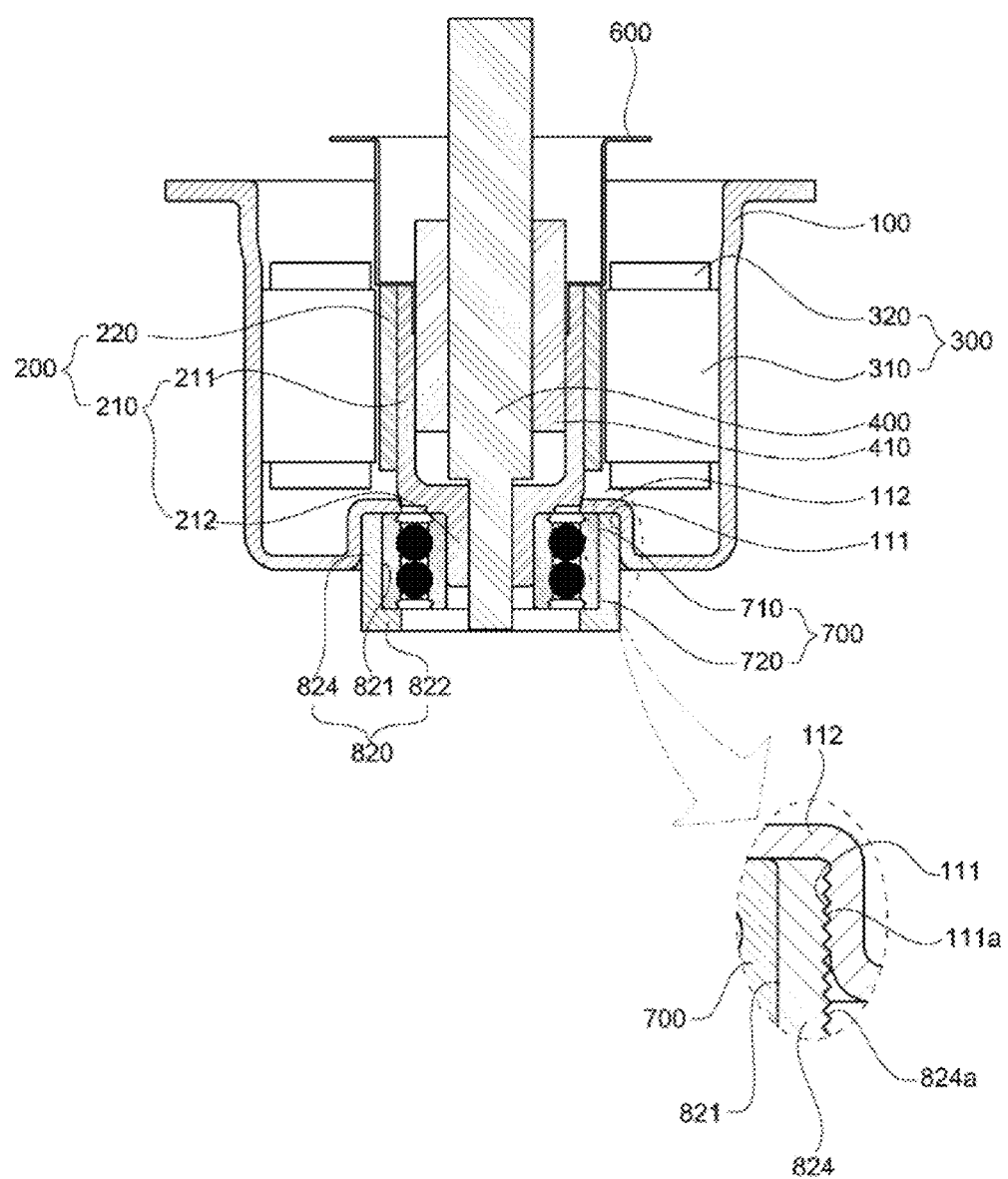
FIG. 4 is a view illustrating a modified example of the motor in accordance with the first embodiment of the present invention.

FIG. 1 is a conceptual view of a motor in accordance with a first embodiment of the present invention, FIG. 2 is an exploded perspective view of FIG. 1, FIG. 3 is a view illustrating various coupling means between a housing and a holder in accordance with the first embodiment of the present invention, and FIG. 4 is a view illustrating a modified example of the motor in accordance with the first embodiment of the present invention.

Referring to FIGS. 1 and 2, the motor in accordance with the present invention includes a housing 100 having a first receiving part 111 formed at one side thereof, a stator 300 disposed in the housing 100, a rotor 200 disposed in the stator 300, a rotating shaft 400 rotatably interlocked with the rotor 200, a motion member 410 linearly moved by a rotation of the rotating shaft 400, a holder 810 coupled to one side of the housing 100, and a bearing 700 disposed between the first receiving part 111 and the holder 810 so as to support a rotation of the rotor 200.

The housing 100 has an internal space in which the stator 300 and the rotor 200 are accommodated. The first receiving part 111 in which the bearing 700 is inserted is formed at one side of the housing 100. The housing 100 may be manufactured by a deep drawing. The deep drawing is a method in which a steel plate material is pressed to have a predetermined shape. A pressing operation may be performed at only one side or both sides of the plate material.

For example, the plate material may be pressed from one side thereof to form an internal space in which the stator 300 and the rotor 200 are accommodated, and then may be pressed from the other side thereof to form the recessed first receiving part 111. The first receiving part 111 may be bent by the pressing operation to have a width in which the bearing 700 is inserted, and may have a first protruding part 112 formed at an end thereof. However, the present invention is not limited thereto, and the housing 100 may be manufactured by a die casting.

The stator 300 may have a well-known shape in which a coil 320 is wound on a stator core 310. In the stator 300, the coil 320 may be wound on an integrated stator core 310, or may be wound on a plurality of divided stator cores 310.

The rotor 200 includes a rotor core 210 having a core part 211 in which the motion member 410 is accommodated, and a rotating support part 212 supported by the bearing 700, and a rotor magnet 220 disposed at an outer circumferential surface of the core part 211.

The core part 211 has a space formed therein so that the motion member 410 is linearly moved, and the rotor magnet 220 is attached on the outer circumferential surface thereof. If necessary, the rotor magnet 220 may be fixed to the outer circumferential surface of the core part 211 by a separate molding material.

The rotating support part 212 is connected with the core part 211, and may be formed so that a diameter of the rotating support part 212 is smaller than that of the core part 211. The rotating shaft 400 is inserted and fixed into the rotating support part 212. Therefore, when the rotor 200 is rotated, the rotating shaft 400 is also integrally rotated.

A cylindrical supporting member 600 may be disposed on the rotor 200. A sensing magnet (not shown) which detects the rotation of the rotor 200 may be attached to the supporting member 600.

The motion member 410 is coupled with the rotating shaft 400 through a ball screw, and thus linearly moved in the core part 211, when the rotating shaft 400 is rotated. For example, the motion member 410 may press a master cylinder of a vehicle brake system, and thus may operate the brake system. In such a pressing process, an axial load is generated at the motor due to a repulsive force. The axial load applied to the motor may be maximally 600 to 800 kgf.

The bearing 700 supports the rotating support part 212 of the rotor core 210. Specifically, the bearing 700 may be a double angular contact bearing which axially and radially supports the rotor 200. Alternatively, the bearing 700 may be configured by stacking a plurality of 4-point contact ball bearings (4PCB).

The holder 810 is coupled to one side of the housing 100 to restrict the bearing 700. The holder 810 includes a second receiving part 811 in which the bearing 700 is accommodated, a second protruding part 812 which fixes the other end 720 of the bearing 700, and a coupling part 814 which is fixed to one side of the housing 100.

The second receiving part 811 may be formed to be bent in an axial direction, and the second protruding part 812 may be formed to be bent perpendicularly to the axial direction. A hole 813 through which the rotating shaft 400 passes may be formed between the second protruding parts 812.

The first receiving part 111 having the first protruding part 112 forms a first receiving space H1 in which a part of the bearing 700 is accommodated, and the second receiving part 811 having the second protruding part 812 forms a second receiving space H2 in which the rest part of the bearing 700 is accommodated.

That is, the first and second receiving parts 111 and 811 are bent in opposite directions to each other so as to form a space H1+H2 in which the bearing 700 is accommodated. Also, the first and second protruding parts 112 and 812 are bent in the same direction as each other so as to restrict the bearing 700.

One end 710 of the bearing 700 is supported by the first protruding part 112, and the other end 720 of the bearing 700 is supported by the second protruding part 812, and a side surface thereof is supported by the first and second receiving parts 111 and 811. Therefore, even when a load is generated in the axial direction (up and down directions of an axis), the bearing 700 may be sufficiently supported.

A coupling means 900 serves to fix the coupling part 814 to the housing 100. Specifically, the coupling means 900 may be a bolt 910 and a nut 920, but is not limited thereto. For example, the coupling means 900 may be a rivet structure 901 as illustrated in FIG. 3A, or may be a structure in which the nut 920 is fastened to a protrusion P of the housing, as illustrated in FIG. 3B.

Referring to FIG. 3A, a thickness D2 of the second protruding part 812 may be formed thicker than a thickness D1 of the first protruding part 112. When the housing 100 is manufactured by the deep drawing, as described above, it is difficult to control the thickness D1 of the first protruding part 112 to be thick, and thus the thickness D2 of the second protruding part 812 is manufactured to be relatively thick, such that a supporting force of the bearing 700 is reinforced.

Referring to FIG. 4, a holder 820 in accordance with the present invention may be formed in a cylindrical shape to be inserted into the first receiving part 111. Specifically, the first receiving part 111 may include a first screw thread 111a formed at an inner circumferential surface thereof, and the holder 820 may include a second receiving part 821 in which the bearing 700 is accommodated, a second protruding part 822 which fixes the other end of the bearing 700, and a coupling part 824 coupled to the first screw thread 111a. The coupling part 824 may include a second screw thread 824a screwed to the first screw thread 111a.

According to such a structure, the holder 820 may reinforce strength of the side surface of the first receiving part 111. That is, since the side surfaces of the first and second receiving parts 111 and 821 doubly support the bearing 700, the supporting force of the bearing is increased. Also, since the holder 820 is screwed to the first receiving part 111, a coupling force is increased.

Figure 5:
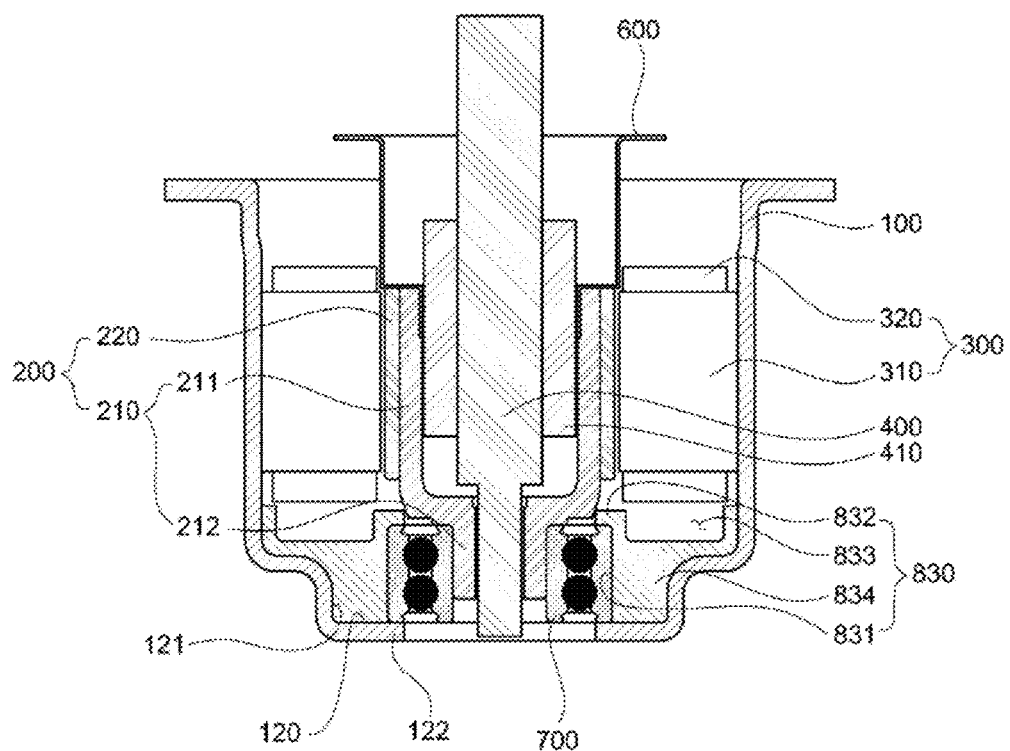
FIG. 5 is a conceptual view of a motor in accordance with a second embodiment of the present invention.
Figure 6:
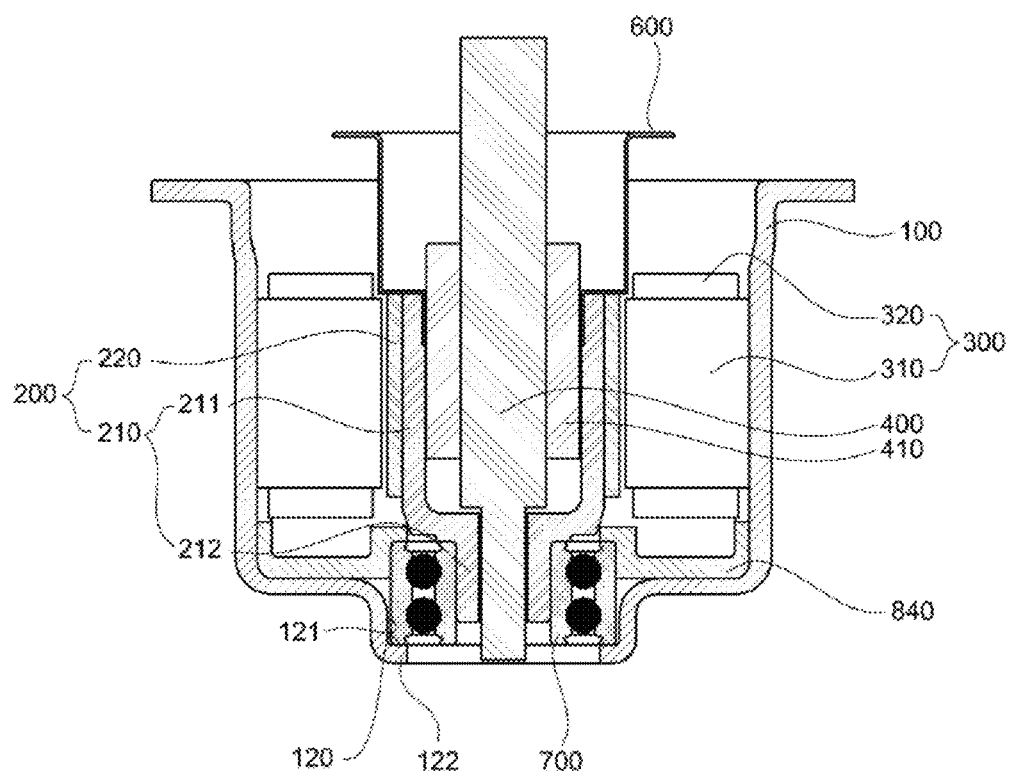
FIG. 6 is a view illustrating a first modified example of the motor in accordance with the second embodiment of the present invention.
Figure 7:
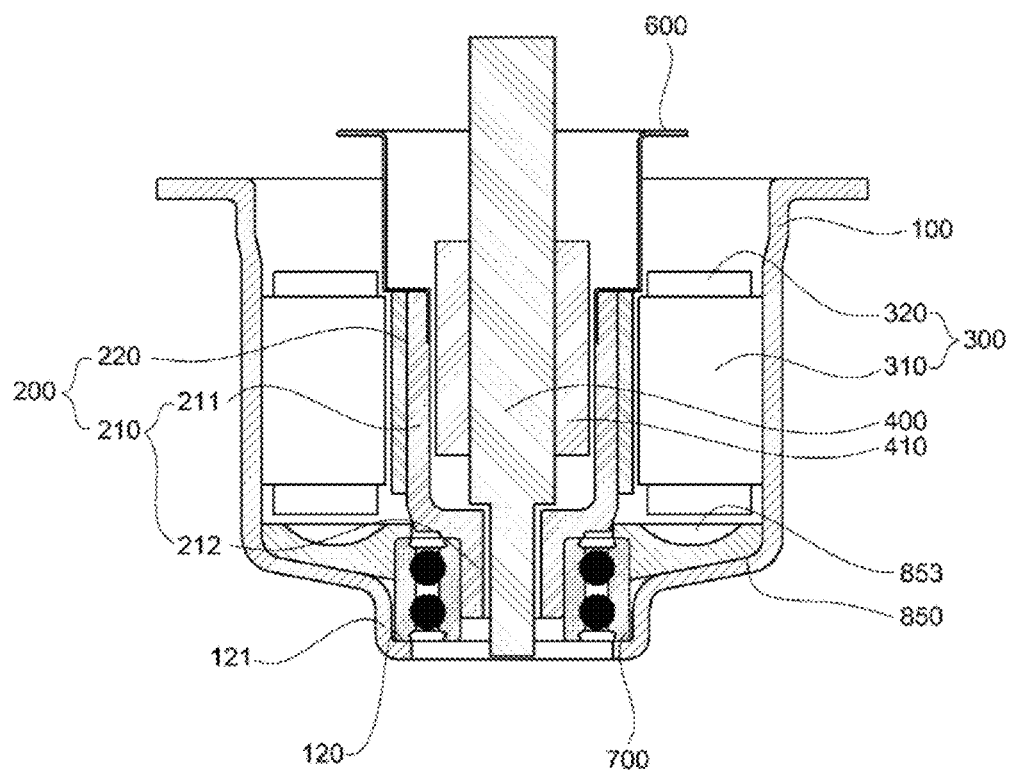
FIG. 7 is a view illustrating a second modified example of the motor in accordance with the second embodiment of the present invention.
Figure 8:
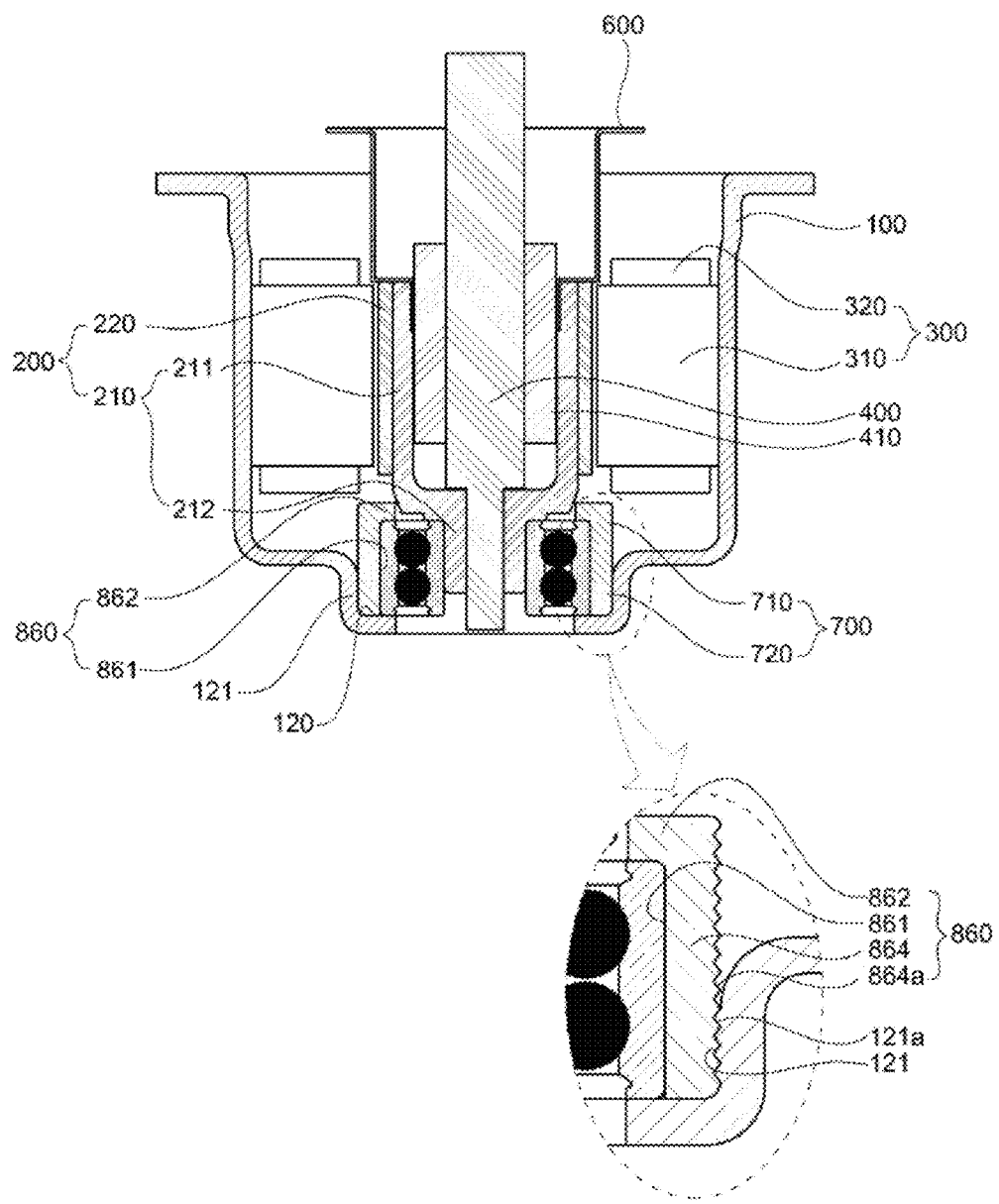
FIG. 8 is a view illustrating a third modified example of the motor in accordance with the second embodiment of the present invention.

FIG. 5 is a conceptual view of a motor in accordance with a second embodiment of the present invention, FIG. 6 is a view illustrating a first modified example of the motor in accordance with the second embodiment of the present invention, FIG. 7 is a view illustrating a second modified example of the motor in accordance with the second embodiment of the present invention, and FIG. 8 is a view illustrating a third modified example of the motor in accordance with the second embodiment of the present invention.

Referring to FIG. 5, the motor in accordance with another embodiment of the present invention includes a housing 100 having a first receiving part 121 formed at one side thereof, a stator 300 disposed in the housing 100, a rotor 200 disposed in the stator 300, a rotating shaft 400 rotatably interlocked with the rotor 200, a motion member 410 linearly moved by a rotation of the rotating shaft 400, a holder 830 disposed between the first receiving part 121 and the stator 300, and a bearing 700 disposed between the first receiving part 121 and the holder 830 so as to support a rotation of the rotor 200.

The rotor 200 and the stator 300 have the same structures as those in the previous embodiment, and thus the description thereof will be omitted. A characteristic part of the embodiment will be described specifically.

The first receiving part 121 in which the bearing 700 is fixed is formed to protrude from a bottom surface 120 of the housing 100. The first receiving part 121 may be bent by a pressing operation to have a width in which the bearing 700 is inserted, and may have a first protruding part 122 formed at an end thereof so as to fix one end of the bearing 700.

The holder 830 is fitted to the housing 100 so as to restrict the bearing 700. Specifically, the holder 820 includes a second receiving part 831 in which the bearing 700 is accommodated, a second protruding part 832 which fixes the other end of the bearing 700, and a coupling part 834 which is fixed to an inner side of the housing 100. Also, the holder 830 includes a groove 833 which is formed at an area facing the stator 300.

The coupling part 834 is disposed between the stator 300 and the bottom surface 120 of the housing 100, and fitted to a side surface and/or the bottom surface 120 of the housing 100. Therefore, the second protruding part 832 presses the bearing 700 to the bottom surface 120 of the housing 100.

According to such a structure, even though a bottom thickness of the housing 100 is relatively thin, the bearing 700 may be sufficiently supported by the holder 830. If necessary, a screw coupling, a rivet or the like may be provided to housing 100 and the holder 830 so as to provide a coupling force.

Referring to FIGS. 6 and 7, shapes of the housing 100 and holders 840 and 850 may be modified variously. For example, as illustrated in FIG. 6, a first insertion part 121 of the housing 100 may directly support the side surface of the bearing 700, and as illustrated in FIG. 7, the bottom surface 120 of the housing 100 may be formed to be inclined. At this time, a groove 853 in which a coil 320 wound on the stator 300 is accommodated may be provided at an upper end of the holder 850.

Referring to FIG. 8, the first insertion part 121 of the housing 100 may include a third screw thread 121a formed at an inner circumferential surface thereof, and a holder 860 may include a second receiving part 861 in which the bearing 700 is accommodated, a second protruding part 862 which fixes the other end of the bearing 700, and a coupling part 864 which is coupled with the third screw thread 121a. The coupling part 864 may include a fourth screw thread 864a screwed to the third screw thread 121a.

According to such a structure, since the insertion part 121 and the holder 860 may support doubly the side surface of the bearing 700, strength of the side surface is enhanced, and a supporting force of the bearing 700 may be enhanced by controlling a screw coupling.

Figure 9:
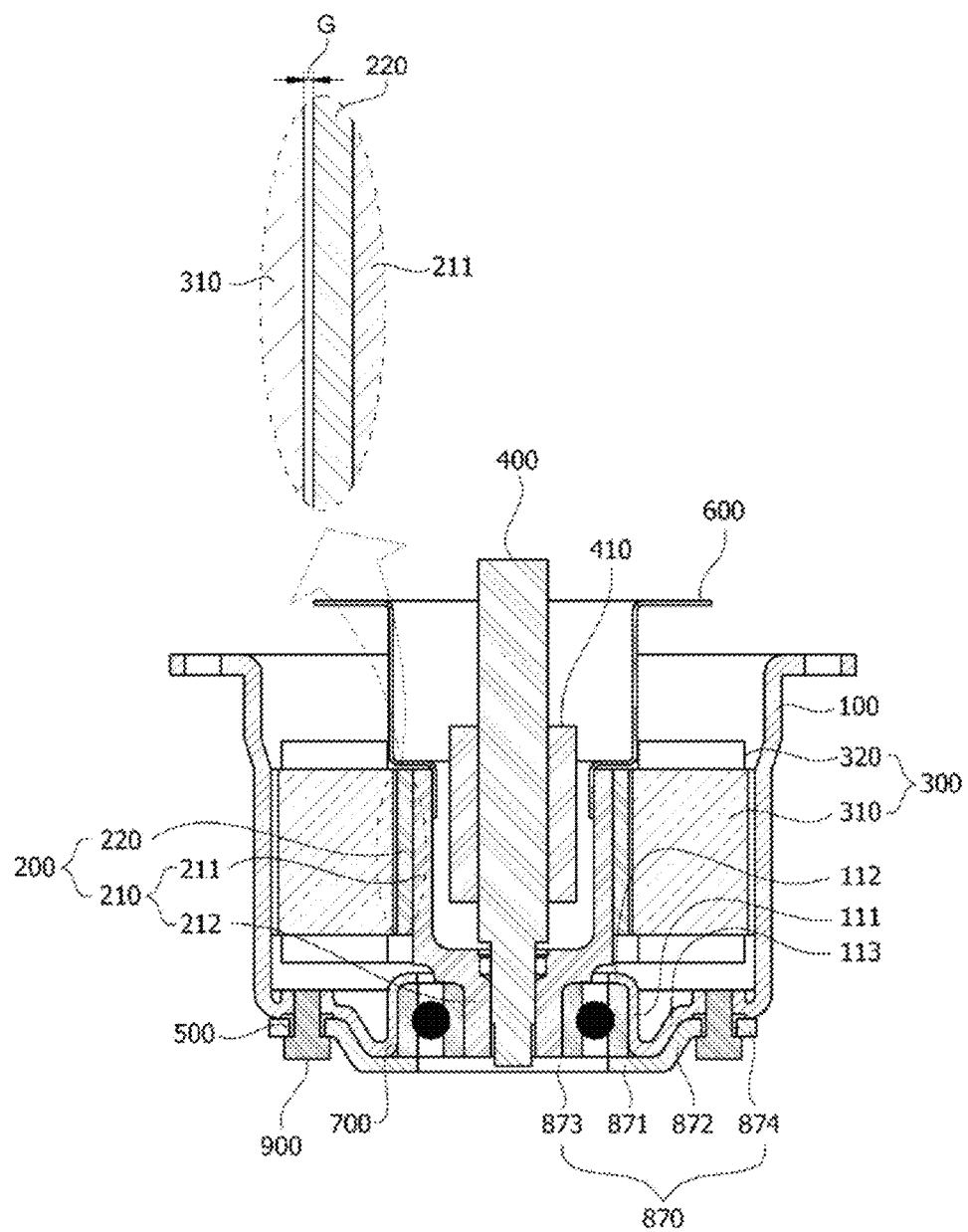
FIG. 9 is a conceptual view of a motor in accordance with a third embodiment of the present invention.
Figure 10:
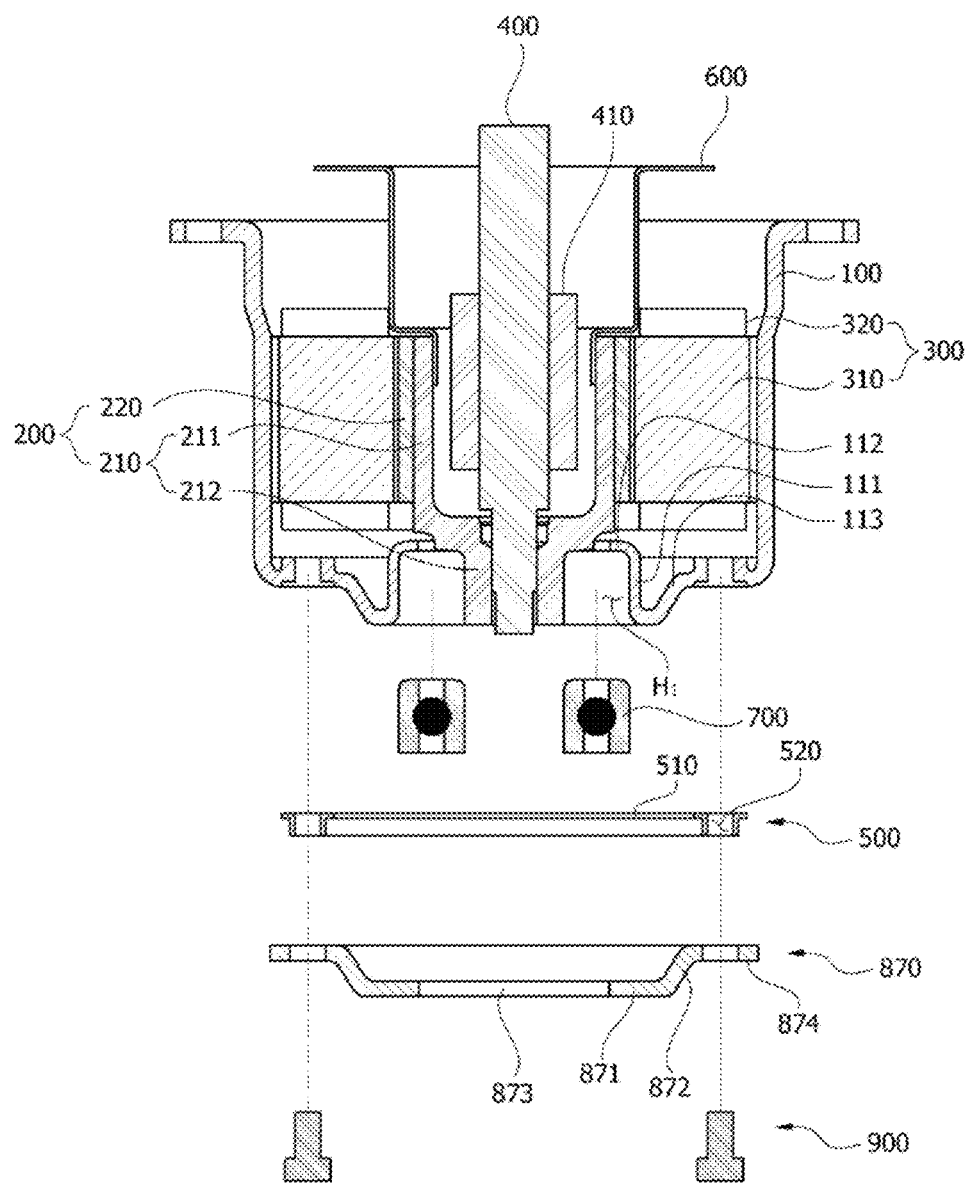
FIG. 10 is a partly exploded view of FIG. 9.

FIG. 9 is a conceptual view of a motor in accordance with a third embodiment of the present invention, and FIG. 10 is a partly exploded view of FIG. 9.

Referring to FIGS. 9 and 10, the motor in accordance with the present invention includes a housing 100 having a first receiving part 111 formed at one side thereof, a stator 300 disposed in the housing 100, a rotor 200 disposed in the stator 300, a rotating shaft 400 rotatably interlocked with the rotor 200, a motion member 410 linearly moved by a rotation of the rotating shaft 400, a holder 870 coupled to one side of the housing 100, and a bearing 700 disposed between the first receiving part 111 and the holder 870 so as to support a rotation of the rotor 200.

The housing 100 has an internal space in which the stator 300 and the rotor 200 are accommodated. The first receiving part 111 in which the bearing 700 is inserted is formed at one side of the housing 100. The housing 100 may be manufactured by a deep drawing. The deep drawing is a method in which a steel plate material is pressed to have a predetermined shape. A pressing operation may be performed at only one side or both sides of the plate material. The deep drawing may reduce a manufacturing cost, compared with a die casting.

For example, the plate material may be pressed from one side thereof to form an internal space in which the stator 300 and the rotor 200 are accommodated, and then may be pressed from the other side thereof to form the recessed first receiving part 111. The first receiving part 111 may be bent by the pressing operation to have a width in which the bearing 700 is inserted, and may have a first protruding part 112 formed at an end thereof. The first receiving part 111 and the first protruding part 112 define a first receiving space H1 in which at least a part of the bearing 700 is accommodated. However, the present invention is not limited thereto, and the housing 100 may be manufactured by a die casting.

The stator 300 may have a well-known shape in which a coil 320 is wound on a stator core 310. In the stator 300, the coil 320 may be wound on an integrated stator core 310, or may be wound on a plurality of divided stator cores 310.

The rotor 200 includes a rotor core 210 having a core part 211 in which the motion member 410 is accommodated, and a rotating support part 212 supported by the bearing 700, and a rotor magnet 220 disposed at an outer circumferential surface of the core part 211.

The core part 211 has a space formed therein so that the motion member 410 is linearly moved, and the rotor magnet 220 is attached on the outer circumferential surface thereof. If necessary, the rotor magnet 220 may be fixed to the outer circumferential surface of the core part 211 by a separate molding material.

A predetermined gap G is formed between an outer circumferential surface of the rotor magnet 220 and an inner circumferential surface of the stator core 310. The gap G may be 0.05 to 10.0 mm, preferably 0.1 to 1.0 mm.

In the motor in accordance with the present invention, since only the rotating support part 212 is supported by the bearing 700, a tilting of the rotor 200, in which the rotor 200 is inclined with respect to an axial direction, may occur, while the rotor 200 is rotated. Therefore, if the gap G is satisfied, an interference between the outer circumferential surface of the rotor magnet 220 and the inner circumferential surface of the stator core 310 may be inhibited.

The rotating support part 212 is interlocked with the core part 211, and form to have a smaller diameter than that of the core part 211. The rotating shaft 400 is inserted and fixed into the rotating support part 212. Therefore, when the rotor 200 is rotated, the rotating shaft 400 is integrally rotated.

A cylindrical supporting member 600 may be disposed on the rotor 200. The supporting member 600 may have a sensing magnet attached thereon to detect the rotation of the rotor 200, or may provide a space in which an external object is inserted and coupled with the motion member 410.

The motion member 410 is coupled with the rotating shaft 400 through a ball screw, and thus linearly moved in the core part 211, when the rotating shaft 400 is rotated. For example, the motion member 410 may press a master cylinder of a vehicle brake system, and thus may operate the brake system. In such a pressing process, an axial load is generated at the motor due to a repulsive force. The axial load applied to the motor may be maximally 600 to 800 kgf.

The bearing 700 supports the rotating support part 212 of the rotor core 210. The bearing 700 may axially and radially support the rotor 200.

A coupling means 900 serves to fix a coupling part 874 of the holder to the housing 100. Specifically, the coupling means 900 may be a bolt, but is not limited thereto. For example, the coupling means 900 may be a rivet structure, or may be a structure in which a protrusion is formed at the housing to be coupled.

Figure 11:
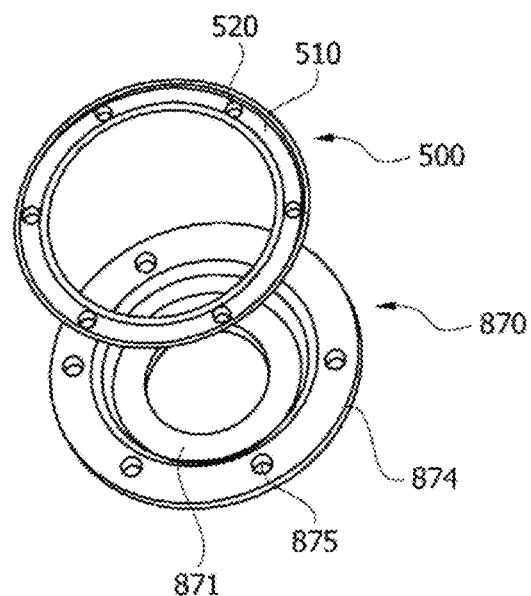
FIG. 11 is a perspective view of a sealing member and a holder of the motor in accordance with the third embodiment of the present invention.

A sealing member 500 is disposed between the first receiving part 111 and the holder 870 to enhance airtightness. The sealing member 500 includes a ring-shaped body 510 and a plurality of holes 520. Referring to FIG. 11, the plurality of the holes 520 are formed at positions corresponding to holes 875 formed at the holder 870.

Figure 12:
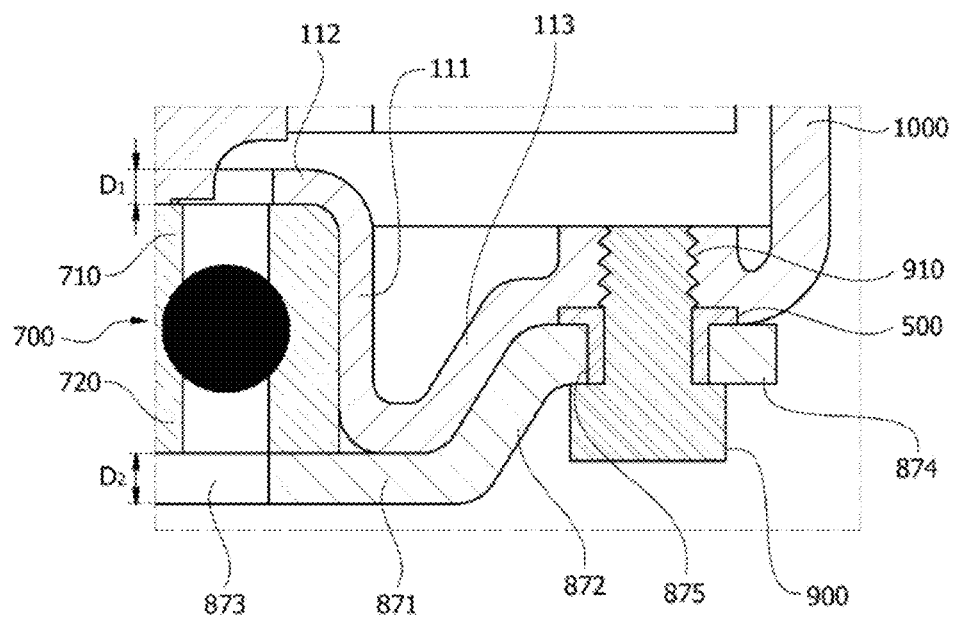
FIG. 12 is a partly enlarged view illustrating a coupling state between the holder and a housing of the motor in accordance with the third embodiment of the present invention.

Referring to FIG. 12, the holder 870 is coupled to one side of the housing 100 so as to restrict the bearing 700. The holder 870 includes a second protruding part 871 which fixes the other end 720 of the bearing 700, the coupling part 874 which is fixed to one side of the housing 100, and a connection part 872 which connects the second protruding part 871 and the coupling part 874. A hole 873 through which the rotating shaft 400 passes may be formed between the second protruding parts 871. If necessary, the second protruding part 871 may be bent to accommodate one side of the bearing 700.

One end 710 of the bearing 700 is supported by the first protruding part 112 of the first receiving part 111, and the other end 720 thereof is supported by the second protruding part 871 of the holder 870, and a side surface thereof is supported by the first receiving part 111. Therefore, even when the load is generated in the axial direction (up and down directions of an axis), the bearing 700 may be sufficiently supported.

At this time, a thickness D2 of the second protruding part 871 may be formed thicker than a thickness D1 of the first protruding part 112. When the housing 100 is manufactured by the deep drawing, as described above, it is difficult to control the thickness D1 of the first protruding part 112 to be thick, and thus the thickness D2 of the second protruding part 871 is manufactured to be relatively thick, such that a supporting force of the bearing 700 is reinforced.

Figure 13:
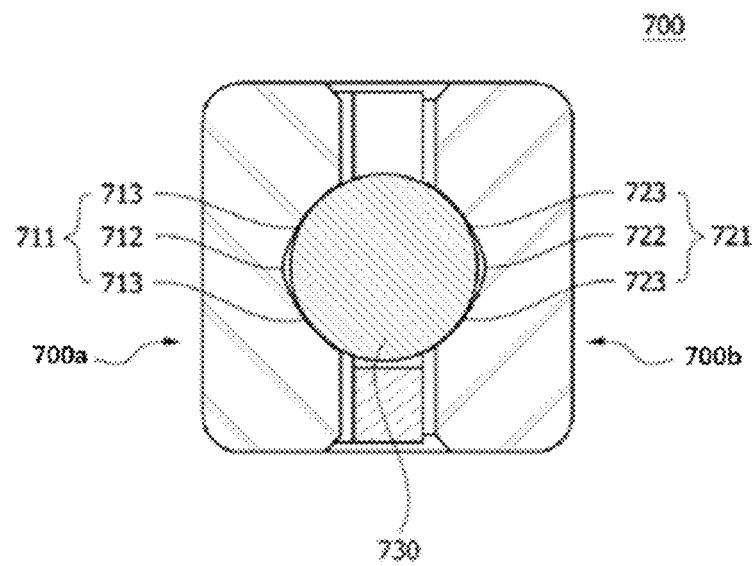
FIG. 13 is a conceptual view illustrating a bearing structure of the motor in accordance with the third embodiment of the present invention.

Referring to FIG. 13, the bearing 700 includes a first supporting ring 700a, a second supporting ring 700b, and a plurality of bearing balls 730 disposed between the first and second supporting rings 700a and 700b. The first and second supporting rings 700a and 700b extend radially and have supporting grooves 711 and 721 in which bearing balls 730 are disposed.

At this time, side surfaces 713 of the first supporting groove 711 are formed to be symmetrical with respect to a center part 712 and to have a larger curvature than that of each bearing ball 730. The center part 712 is spaced a predetermined distance from the bearing ball 730 and thus not in contact with the bearing ball 730. Therefore, one point of each side surface 713 is in contact with the bearing ball 730. The second supporting groove 721 is also formed in the same manner. Therefore, the bearing ball 730 is in contact with each side surface of the first and second supporting grooves 711 and 721, and thus may be supported axially and radially.

Figure 14:
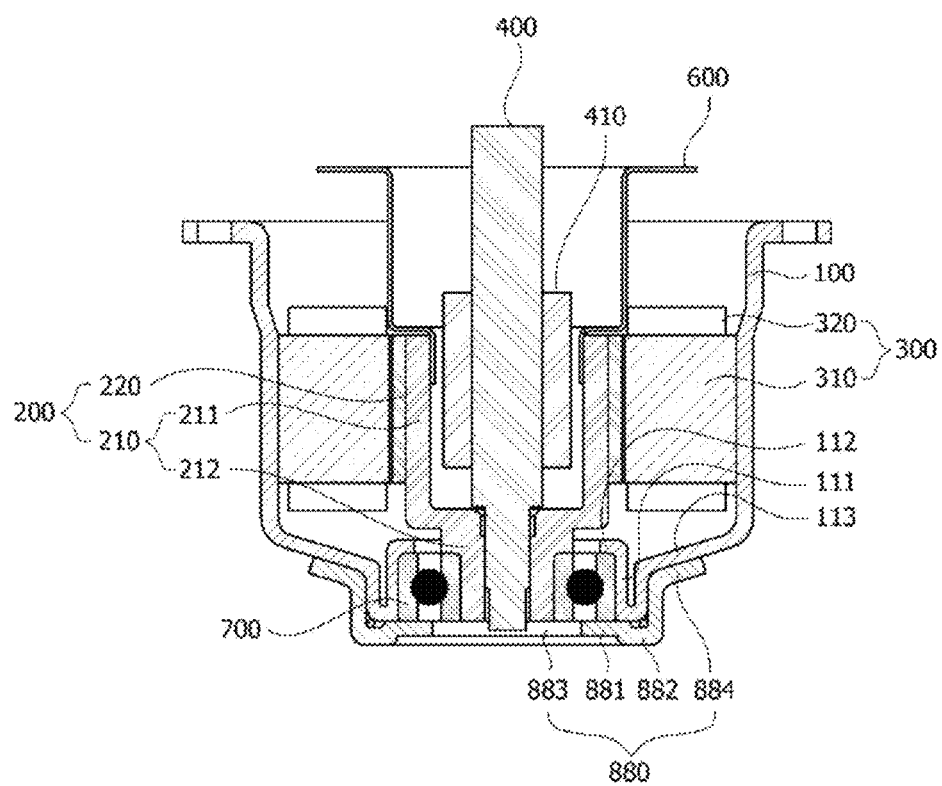
FIG. 14 is a conceptual view of a motor in accordance with a fourth embodiment of the present invention.
Figure 15:
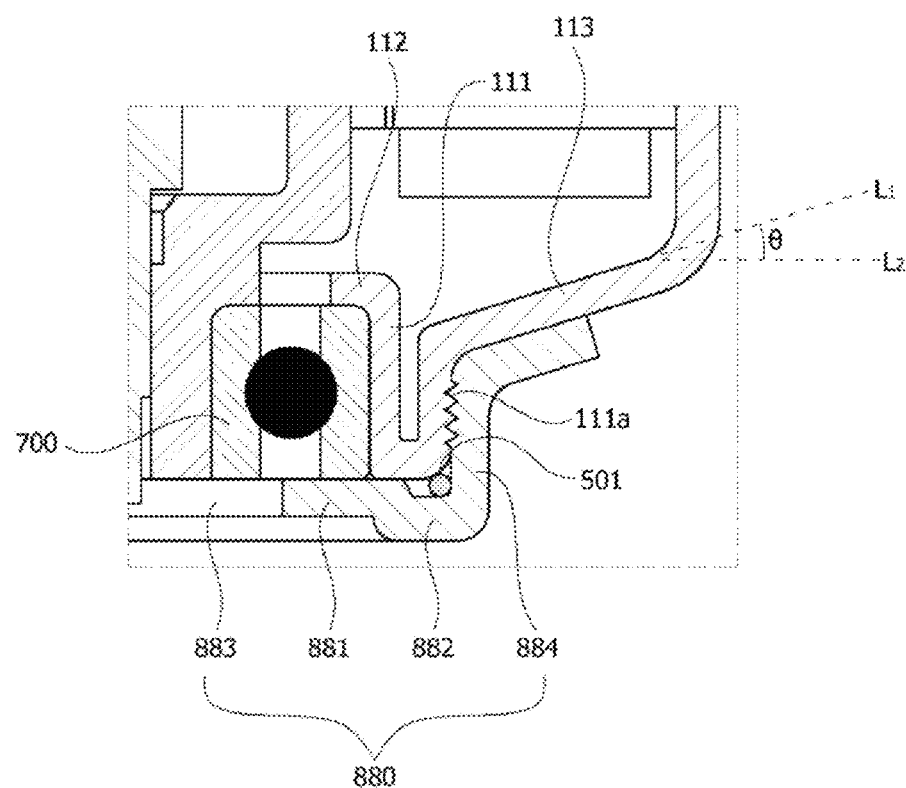
FIG. 15 is a partly enlarged view illustrating a coupling state between a holder and a housing of the motor in accordance with the fourth embodiment of the present invention.

FIG. 14 is a conceptual view of a motor in accordance with a fourth embodiment of the present invention, and FIG. 15 is a partly enlarged view illustrating a coupling state between a holder and a housing of the motor in accordance with the fourth embodiment of the present invention.

The motor in accordance with the present invention includes a housing 100 having a first receiving part 111 formed at one side thereof, a stator 300 disposed in the housing 100, a rotor 200 disposed in the stator 300, a rotating shaft 400 rotatably interlocked with the rotor 200, a motion member 410 linearly moved by a rotation of the rotating shaft 400, a holder 880 coupled to one side of the housing 100, and a bearing 700 disposed between the first receiving part 111 and the holder 880 so as to support a rotation of the rotor 200. This structure is the same as that in the previous embodiment, and thus the detailed description thereof will be omitted.

The holder 880 includes a second protruding part 881, a coupling part 884 which is coupled with the housing 100, a connection part 882 which connects the second protruding part 881 and the coupling part 884, and a through-hole 883 which is formed at a center thereof. The coupling part 884 is coupled to a first screw thread 111a formed at an outer circumferential surface of the first receiving part 111. At this time, a sealing member 501 is disposed between the first receiving part 111 and the holder 880.

An inclined surface 113 forming a bottom surface of the housing 100 is formed to be gradually narrower toward the first receiving part 111. That is, the inclined surface 113 of the housing 100 is tapered toward a center thereof. According to such a structure, a deformation of the housing due to the axial load may be minimized. Specifically, an imaginary line L1 extending from the inclined surface 113 has an angle of 5 to 60 degrees with respect to a line L2 perpendicular to an axial direction.

One end of the bearing 700 is supported by a first protruding part 112, and the other end thereof is supported by the second supporting part 881, and a side surface thereof is supported by the first receiving part 111. Therefore, even when the load is generated in the axial direction (up and down directions of an axis), the bearing 700 may be sufficiently supported.

According to the present invention, the housing can be manufactured by the deep drawing, and thus the manufacturing cost of the motor can be reduced.

Also, even when the axial load is applied, the bearing can be stably supported.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A motor comprising:
   a housing;
   a stator disposed within the housing;
   a rotor disposed within the stator;
   a bearing disposed on an outer circumferential surface of the rotor; and
   a holder coupled to the bearing,
   wherein the holder is disposed in the housing,
   wherein a portion of the holder is contacted with an upper surface of an outer ring of the bearing,
   wherein a portion of the housing is contacted with a lower surface of the outer ring of the bearing,
   wherein the rotor comprises a rotor core having a core part and a rotating support part supported by the bearing, and a rotor magnet disposed at an outer circumferential surface of the core part, and
   wherein the rotating support part is formed by bending inward from a lower end of the core part.

2. The motor of claim 1, wherein an outer diameter of the rotating support part is smaller than an outer diameter of the core part.

3. The motor of claim 2, wherein the bearing is disposed at an outer circumferential surface of the rotating support.

4. The motor of claim 3, wherein the housing comprises a cylindrical body, a first receiving part is formed by bending inward from a lower end of the body, and a first protruding part is formed by protruding inward form an end of the first receiving part, and
   wherein the holder is disposed in contact with an upper surface of the first protruding part.

5. The motor of claim 4, wherein the first protruding part is disposed in contact with the lower surface of the outer ring of the bearing and is configured to fix the lower surface of the bearing.

6. The motor of claim 5, wherein the holder comprises a coupling part, and a second protruding part protruding from one portion of the coupling part and disposed in contact with the upper surface of the outer ring of the bearing.

7. The motor of claim 6, wherein the coupling part is disposed inside the housing to contact the inner surface of the first receiving part and the first protruding part of the housing.

8. The motor of claim 6, wherein the holder comprises a groove formed concavely in an upper surface of the coupling part,
   wherein the groove is disposed at a position corresponding to a position of the stator.

9. The motor of claim 6, wherein the first receiving part and the coupling part each comprises screw thread,
   wherein the screw thread of the first receiving part and the screw thread of the coupling part are fixed by screwing.

10. The motor of claim 3, wherein the housing comprises a cylindrical body, a first receiving part is formed by bending inward from a lower end of the body, and a first protruding part is formed by protruding inward from an end of the first receiving part, and
    wherein the holder is disposed in contact with an upper surface of the first receiving part.

11. The motor of claim 10, wherein the first protruding part is disposed in contact with the lower surface of the outer ring of the bearing and is configured to fix the lower surface of the bearing.

12. The motor of claim 11, wherein the holder comprises a coupling part, and a second protruding part protruding from one portion of the coupling part and disposed in contact with the upper surface of the outer ring of the bearing.

13. The motor of claim 12, wherein the coupling part is disposed inside the housing to contact the inner surface of the first receiving part and the first protruding part of the housing.

14. The motor of claim 13, wherein the holder comprises a groove formed concavely in an upper surface of the coupling part,
   wherein the groove is disposed at a position corresponding to a position of the stator.

15. The motor of claim 14, wherein a diameter of the first receiving part decreases from the body to die first protruding part.

\* \* \* \* \*